U S012169295B2

(12) United States Patent
Griffith

(10) Patent No.: US 12,169,295 B2
(45) Date of Patent: Dec. 17, 2024

(54) MICRO-LAYERED MULTI-PHASE LENS DESIGN AND OPTICAL SYSTEM FOR ENHANCED PEPPER'S GHOST PROJECTION AND OTHER OPTICAL PROJECTIONS

(71) Applicant: IKIN, Inc., San Diego, CA (US)

(72) Inventor: Taylor Scott Griffith, San Diego, CA (US)

(73) Assignee: IKIN, Inc., Dripping Springs, TX (US)

( * ) Notice: Subject to any disclaimer, the term of this patent is extended or adjusted under 35 U.S.C. 154(b) by 417 days.

(21) Appl. No.: 17/560,963

(22) Filed: Dec. 23, 2021

(65) Prior Publication Data

US 2022/0196894 A1 Jun. 23, 2022

Related U.S. Application Data

(60) Provisional application No. 63/130,191, filed on Dec. 23, 2020.

(51) Int. Cl.
*G02B 5/08* (2006.01)
*G03B 21/56* (2006.01)

(52) U.S. Cl.
CPC .......... *G02B 5/0816* (2013.01); *G03B 21/56* (2013.01)

(58) Field of Classification Search
CPC ................. G02B 5/0816; G02B 1/111; G02B 2027/012; G02B 27/0172; G02B 27/145;
(Continued)

(56) References Cited

U.S. PATENT DOCUMENTS

| D318,284 S | 7/1991 | Kwok Wah Lo |
| D318,478 S | 7/1991 | Wah Lo |

(Continued)

FOREIGN PATENT DOCUMENTS

| CN | 1426168 A | 6/2003 |
| CN | 202838896 U | 3/2013 |

(Continued)

OTHER PUBLICATIONS

Cauchard, et al. Steerable projection: exploring alignment in interactive mobile displays, Personal and Ubiquitous Computing, Jan. 2012, pp. 27-37.

(Continued)

*Primary Examiner* — Magda Cruz
(74) *Attorney, Agent, or Firm* — Cooley LLP

(57) ABSTRACT

A micro-layered structure for use in an optical projection system is configured to reflect incident light as multiple closely aligned reflections. A first semi-reflective transparent layer of the structure has a first index of refraction, a first front surface and a first rear surface. A second semi-reflective transparent layer of the structure has a second index of refraction different from the first index of refraction, a second front surface and a second rear surface. The second front surface abuts the first rear surface of the first semi-reflective transparent layer. Portions of the incident light are respectively reflected by the first front surface, first rear surface, second front surface and second rear surface as first, second, third and fourth reflections which collectively form a projection of the image perceived by a user of the optical projection system.

28 Claims, 6 Drawing Sheets

(58) Field of Classification Search
CPC ........ G02B 2027/0194; G02B 27/0018; G03B 21/56
See application file for complete search history.

(56) References Cited

U.S. PATENT DOCUMENTS

| | | | |
|---|---|---|---|
| D329,448 S | 9/1992 | Lo | |
| 5,677,701 A | 10/1997 | Okuyama | |
| D410,450 S | 6/1999 | Solero | |
| 6,481,851 B1 | 11/2002 | McNelley et al. | |
| 6,637,896 B2 | 10/2003 | Li | |
| 6,710,797 B1 | 3/2004 | McNelley et al. | |
| D555,656 S | 11/2007 | Bishop et al. | |
| D560,668 S | 1/2008 | Pritchard et al. | |
| D608,380 S | 1/2010 | Nagase et al. | |
| D671,939 S | 12/2012 | Chung | |
| D685,779 S | 7/2013 | Schriefer | |
| D687,877 S | 8/2013 | Chang | |
| D698,773 S | 2/2014 | Wildner | |
| D699,205 S | 2/2014 | Kim et al. | |
| D703,626 S | 4/2014 | Hermansen | |
| 8,820,936 B2 | 9/2014 | Chen | |
| D730,854 S | 6/2015 | Jung | |
| D732,489 S | 6/2015 | Kumano et al. | |
| D735,709 S | 8/2015 | Daniel | |
| D739,838 S | 9/2015 | Lang et al. | |
| D741,854 S | 10/2015 | Daniel | |
| D743,922 S | 11/2015 | Li et al. | |
| D759,659 S | 6/2016 | Lee et al. | |
| D761,790 S | 7/2016 | Yamazaki | |
| D763,839 S | 8/2016 | Shin | |
| 9,723,246 B2 | 8/2017 | Thomas | |
| D796,570 S | 9/2017 | Peng et al. | |
| D812,605 S | 3/2018 | Sanda | |
| D816,627 S | 5/2018 | Kim | |
| D836,077 S | 12/2018 | Cho | |
| D841,719 S | 2/2019 | Meneses | |
| D859,396 S | 9/2019 | Lee | |
| D927,635 S | 8/2021 | Choi et al. | |
| D930,559 S | 9/2021 | Diboine et al. | |
| D930,604 S | 9/2021 | Pyo et al. | |
| D934,826 S | 11/2021 | Wang | |
| 11,258,890 B2 | 2/2022 | Griffith | |
| D969,640 S | 11/2022 | Burkardt et al. | |
| D969,803 S | 11/2022 | Zhu | |
| D973,655 S | 12/2022 | Chang et al. | |
| D988,277 S | 6/2023 | Griffith | |
| D994,011 S | 8/2023 | Griffith | |
| 11,792,311 B2 | 10/2023 | Griffith | |
| D1,009,969 S | 1/2024 | Griffith | |
| 2002/0058531 A1 | 5/2002 | Terasaki | |
| 2003/0114200 A1 | 6/2003 | Lee | |
| 2006/0145947 A1 | 7/2006 | Arneson | |
| 2007/0121087 A1 | 5/2007 | Garg | |
| 2008/0068565 A1 | 3/2008 | Ko | |
| 2008/0212271 A1 | 9/2008 | Misawa | |
| 2009/0128785 A1 | 5/2009 | Silverstein | |
| 2010/0045569 A1 | 2/2010 | Estevez | |
| 2010/0097439 A1 | 4/2010 | Kroll et al. | |
| 2011/0037952 A1 | 2/2011 | LaDuke | |
| 2012/0127320 A1 | 5/2012 | Balogh | |
| 2012/0287503 A1 | 11/2012 | Mase | |
| 2012/0300275 A1 | 11/2012 | Vilardell et al. | |
| 2013/0187950 A1 | 7/2013 | Nowatzyk | |
| 2014/0118807 A1 | 5/2014 | Su | |
| 2014/0253991 A1 | 9/2014 | Vilardell et al. | |
| 2016/0041522 A1 | 2/2016 | Brasil | |
| 2016/0165208 A1 | 6/2016 | Liu et al. | |
| 2017/0205854 A1 | 7/2017 | Zenoff | |
| 2017/0236491 A1 | 8/2017 | Foster et al. | |
| 2017/0322513 A1 | 11/2017 | Zapanta | |
| 2019/0196188 A1* | 6/2019 | Hirata | B60K 1/00 |
| 2020/0213433 A1 | 7/2020 | Griffith | |
| 2020/0400945 A1* | 12/2020 | Fischer | B32B 17/1077 |
| 2022/0050287 A1* | 2/2022 | Vanderlofske, III | G02B 27/00 |
| 2022/0078271 A1 | 3/2022 | Griffith | |
| 2022/0404536 A1 | 12/2022 | Griffith | |
| 2022/0404537 A1 | 12/2022 | Griffith | |
| 2024/0061162 A1 | 2/2024 | Griffith | |

FOREIGN PATENT DOCUMENTS

| | | | |
|---|---|---|---|
| CN | 104054027 A | 9/2014 | |
| CN | 203941674 U | 11/2014 | |
| CN | 104935917 A | 9/2015 | |
| CN | 206311897 U | 7/2017 | |
| CN | 206684482 U | 11/2017 | |
| CN | 111711279 A | 9/2020 | |
| CN | 307756611 | 12/2022 | |
| EP | 1678529 A1 | 7/2006 | |
| EP | 3451661 A1 | 3/2019 | |
| ES | 2406205 A2 | 6/2013 | |
| FR | 3022040 A1 | 12/2015 | |
| GB | 2508404 A | 6/2014 | |
| JP | 2005517986 A | 6/2005 | |
| JP | 2009134147 A | 6/2009 | |
| JP | 3180075 U | 12/2012 | |
| JP | 2015176141 A | 10/2015 | |
| JP | 2017531212 A | 10/2017 | |
| JP | 2018501499 A | 1/2018 | |
| KR | 20150120712 A | 10/2015 | |
| KR | 3008966560000 | 3/2017 | |
| RU | 2556291 C2 | 7/2015 | |
| WO | WO-2009134228 A1 * | 11/2009 | ............... A63J 21/00 |
| WO | WO-2011045437 A1 | 4/2011 | |
| WO | WO-2014073093 A1 | 5/2014 | |
| WO | WO-2016047914 A1 | 3/2016 | |
| WO | WO-2016075437 A1 | 5/2016 | |
| WO | WO-2017116426 A1 | 7/2017 | |
| WO | WO-2018012541 A1 | 1/2018 | |
| WO | WO-2020185963 A1 | 9/2020 | |
| WO | WO-2022140678 A1 | 6/2022 | |
| WO | WO-2022271754 A2 | 12/2022 | |
| WO | WO-2022271755 A1 | 12/2022 | |

OTHER PUBLICATIONS

Holographic Presentation of 3D Data Becoming a Reality—IKIN at CES 2021, publication date Jan. 15, 2021, 2 pages.
Samsung Galaxy S11 with docking station for aerial projection, publication date Sep. 30, 2019, 10 pages, [online][site visited Apr. 12, 2021] URL: https://nl.letsgodigital.org/smartphones/samsung-smartphone-docking-station-3d-hologram/.
United States Patent and Trademark Office, International Search Report and Written Opinion, Jul. 16, 2020 for International Application No. PCT/US2020/022186, 11 pages.
International Search Report and Written Opinion for International Application No. PCT/US2022/034416 dated Jan. 16, 2023, 19 pages.
Avery, et al., Kitware, Desktop Holograms for Materials Science, available at kitware.com, date published Jul. 5, 2021, site visited Jan. 12, 2023, 10 pages available at URL: https://www.kitware.com/holograms-how-to-with-tomviz/ (Year: 2021).
European Patent Office, Extended European Search Report for European Application No. 20770258.0, Nov. 9, 2022, 9 pages.
European Patent Office, International Search Report and Written Opinion for International Application No. PCT/US2021/065095, Apr. 13, 2022, 14 pages.
European Patent Office, Invitation to Pay Additional Fees and, Where Applicable, Protest Fees for International Application No. PCT/US2022/034416, Nov. 14, 2022, 12 pages.
United States Patent and Trademark Office, International Search Report and Written Opinion, Oct. 12, 2022 for International Application No. PCT/US2022/034418, 14 pages.
Hamblen M., "Ikin Ships Holographic ARC Terminal . . . ", Available at fierceelectronics.corn, date published Jun. 13, 2022, 3 pages Site Visited Jan. 12, 2023, available at URL: https://www.fierceelectronics.com/sensors/ikin-arc-ships-commercial-holographic-desktop-terminal-no-need-goggles (Year: 2022).

(56) References Cited

OTHER PUBLICATIONS

Kitware, "Desktop Holograms for Materials Science . . . ", available at kitware.com, date published Jul. 5, 2021, 10 pages site visited Jan. 12, 2023, available at URL: https://www.kitware.com/holograms-how-to-with-tomviz/(Year: 2021).
United States Patent and Trademark Office, Notice of Allowance for U.S. Appl. No. 29/795,076 dated Mar. 5, 2023, 7 pages.
United States Patent and Trademark Office, Notice of Allowance for U.S. Appl. No. 29/795,362 dated Feb. 1, 2023 7 pages.
International Preliminary Report on Patentability for International Application No. PCT/US2021/065095 dated Jul. 6, 2023, 8 pages.
International Preliminary Report on Patentability for International Application PCT/US2020/022186, mailed on Sep. 23, 2021, 8 Pages.
International Preliminary Report on Patentability for International Application PCT/US2022/034418, mailed on Jan. 4, 2024, 9 Pages.
International Preliminary Report on Patentability for International Application No. PCT/US2022/034416 mailed Dec. 14, 2023, 11 pages.

\* cited by examiner

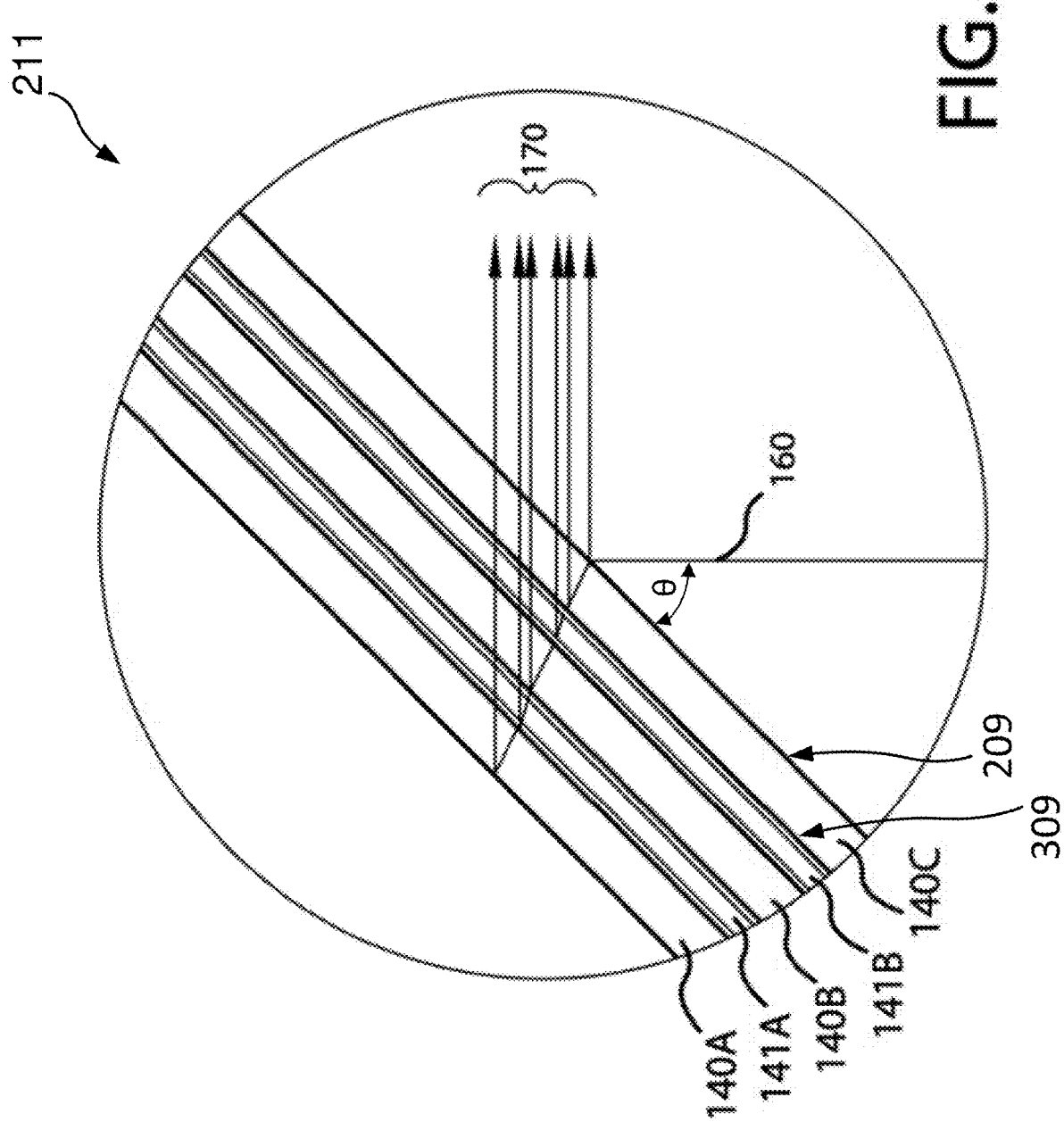

MICRO-LAYERED MULTI-PHASE LENS DESIGN AND OPTICAL SYSTEM FOR ENHANCED PEPPER'S GHOST PROJECTION AND OTHER OPTICAL PROJECTIONS

CROSS-REFERENCE TO RELATED APPLICATIONS

This application claims the benefit of priority under 35 U.S.C. § 119(e) of U.S. Provisional Patent Application No. 63/130,191, entitled MICRO-LAYERED MULTI-PHASE LENS DESIGN AND OPTICAL SYSTEM FOR ENHANCED PEPPER'S GHOST PROJECTION AND OTHER OPTICAL PROJECTIONS, filed Dec. 23, 2020, the content of which is incorporated herein by reference in its entirety for all purposes.

FIELD

The present disclosure relates to projection systems for projecting an image from a transparent reflector material. More particularly, but not exclusively, the present disclosure relates to projection systems in which the transparent reflector is arranged in an inclined position so that images projected by the reflector are perceived as floating optical fields, commonly referred to as "Pepper's Ghost" projections, and to related techniques for improving the quality and brightness of such image projections.

BACKGROUND

In holographic, or mixed reality media, visuals systems are commonly built in order for a visual projection from a projection source is reflected from a semi-transparent medium to a viewer's eye, allowing for software driven visual systems to overlay visual data above the genuine environment before the user. This style of projection is, at times, referred to as Pepper's Ghost holography or optical illusions.

In such systems multiple factors can affect and degrade the quality of the image being projected onto said medium, most notably, the general light ambience of the environment in which a projection is being experienced. If the background light is excessively luminous, the image being projected becomes faded or transparent, and eventually difficult to perceive. The ideal medium on which to project the image is debated and widely argued. Mirrors, prisms, inclined foils comprised of glass, polyurethanes, polycarbonates, or other polymers are often used to create these visual illusions.

When attempting to create smaller, portable Pepper's Ghost display systems the difficulty of material thickness arises and prohibits the widespread use of such devices. A visual disturbance is caused by a secondary reflection of the back surface of a transparent medium, resulting in a ghosting image or "fuzzing". Because of this visual disturbance, large stage systems must tension a foil that is very thin so as not to allow for the visual disturbance to be noticeable to the viewer.

A further problem in such reflective displays, which includes headset displays such as Augmented Reality Goggles and similar headwear is the inability to sustain a visible field of light in high ambience environments. The common response to this problem is the dense polarization, or darkening, of the reflective surface, to compete with the external light energy so as not to obscure the image from the users view. However, this method is ineffective when the intended use of such a device is to project an image clearly and in a way that appears genuine in the environment.

SUMMARY

Disclosed herein is a micro-layered transparent lens structure, or foil, used in a projection apparatus. Also disclosed is a projection apparatus incorporating such a micro-layered transparent lens arranged in an inclined position to create perceived floating optical fields, commonly referred to as "Pepper's Ghost" projections.

Aspects of the present disclosure relate to the use of a reflective, semi-reflective, semi-transparent and micro-layered material, used in reflecting and refracting light so as to sustain a visibly stronger optical field throughout the medium, achieved by capturing the light lost in refraction, and retransmitting said light in the form of a close secondary reflection. The present disclosure includes multiple methods configured to vary the strength of the optical field held within the medium.

The micro-layered material disclosed herein is intended to limit the loss of light energy, due to refraction, and increase the reflectivity of the material without compromising transparency. This permits the genuine background behind the micro-layered structure to be clearly viewed, without darkening or polarization, and the interfering reflected optical field to be sustained in bright, well-lit areas.

The micro-layered structure can be employed as, for example and without limitation, an angular foil for a Pepper's Ghost illusion system, in which a light source projects an image onto the surface of the medium. The subsequent reflected image is then visible to a viewer as a "blended" visual system.

In in one aspect the disclosure relates to a micro-layered structure for use in an optical projection system. The micro-layered structure includes a first semi-reflective transparent layer having a first index of refraction, the first semi-reflect transparent layer having a first front surface and a first rear surface. The structure further includes a second semi-reflective transparent layer having a second index of refraction different from the first index of refraction. The second semi-reflect transparent layer has a second front surface and a second rear surface, the second front surface abutting the first rear surface of the first semi-reflective transparent layer. The micro-layered structure is configured to reflect incident light as multiple reflections. A first portion of the incident light is reflected by the first front surface as a first reflection, a second portion of the incident light is reflected by the first rear surface as a second reflection, a third portion of the incident light is reflected by the second front surface as a third reflection and a fourth portion of the incident light is reflected by the second rear surface as a fourth reflection. The first reflection, the second reflection, the third reflection and the fourth reflection collectively form a projection of the image where the projection of the image is perceived by a user of the optical projection system to be located behind the micro-layered structure.

In one configuration the second index of refraction is at least 0.15 greater than the first index of refraction. In another configuration the first semi-reflective transparent layer is of a first thickness and the second semi-reflective transparent layer is of a second thickness where the first thickness and the second thickness are not greater than 0.5 mm. In an additional configuration the first thickness and the second thickness are not greater than 0.125 mm.

The disclosure is also directed to a micro-layered structure for use in an optical projection system. The micro-layered structure includes a first semi-reflective transparent layer having a first index of refraction. The first semi-reflective transparent layer has a first front surface and a first rear surface. A second semi-reflective transparent layer has a second index of refraction different from the first index of refraction, the second semi-reflective transparent layer having a second front surface and a second rear surface. A first adhesive layer is interposed between the second front surface of the second semi-reflective transparent layer and the first rear surface of the first semi-reflective transparent layer. The first adhesive layer joins the first semi-reflective transparent layer to the second semi-reflective transparent layer and has a third index of refraction different from the first index of refraction and the second index of refraction. The micro-layered structure is configured to reflect incident light defining an image as multiple reflections. A first portion of the incident light is reflected by the first front surface as a first reflection, a second portion of the incident light is reflected by the first rear surface as a second reflection, a third portion of the incident light is reflected by the second front surface and a fourth portion of the incident light is reflected by the second rear surface. The first reflection, the second reflection, the third reflection and the fourth reflection collectively form a projection of the image perceptible to a user of the projection system.

In one implementation the first index of refraction is equal to the second index of refraction and in another implementation the first index of refraction is different from the second index of refraction. In a particular configuration the first semi-reflective transparent layer is of a first thickness and the second semi-reflective transparent layer is of a second thickness where the first thickness and the second thickness are not greater than 2 mils. In another configuration the first thickness and the second thickness are not greater than 1 mil. In another implementation the first index of refraction and the second index of refraction are at least 1.50 and the third index of refraction is at least 0.05 greater than the first index of refraction and the second index of refraction.

In another aspect the disclosure pertains to an optical projection system including a projector configured to transmit light defining an image. A semi-transparent micro-layered structure having a front surface arranged at an angle to a plane of emission of the light transmitted by the projector is configured to produce a projection of the image which appears to be located behind a rear surface of the semi-transparent micro-layered structure. The semi-transparent micro-layered structure includes a first semi-reflective transparent layer having a first index of refraction and a second semi-reflective transparent layer having a second index of refraction. A first adhesive layer is interposed between the first semi-reflective transparent layer and the second semi-reflective transparent layer. The first adhesive layer has a third index of refraction different from the first index of refraction and the second index of refraction.

In one configuration of the optical projection system the first index of refraction and the second index of refraction are substantially equal. In another configuration of the optical projection system the first index of refraction is equal to the second index of refraction. In another configuration of the optical projection system the first index of refraction is different from the second index of refraction. In a specific configuration of the projection system the first index of refraction and the second index of refraction are at least 1.60 and the third index of refraction is at least 0.05 greater than the first index of refraction and the second index of refraction. In one implementation of the projection system the first semi-reflective transparent layer is of a first thickness and the second semi-reflective transparent layer is of a second thickness where the first thickness and the second thickness are not greater than 2 mils. In another implementation the first thickness and the second thickness are not greater than 1 mil.

The disclosure also relates to an optical projection system including a projector configured to transmit light defining an image. The system includes a semi-transparent micro-layered structure having a front surface arranged at an angle to a plane of emission of the light transmitted by the projector and configured to produce a projection of the image such that the image appears to be located behind a rear surface of the semi-transparent micro-layered structure. The semi-transparent micro-layered structure includes a first semi-reflective transparent layer having a first index of refraction. A second semi-reflective transparent layer has a second index of refraction. The micro-layered structure is configured to reflect the light transmitted by the projector as multiple closely aligned reflections collectively forming a projection of the image perceptible to a user of the optical projection system.

In one configuration the first index of refraction is equal to the second index of refraction and in another configuration the first index of refraction is different from the second index of refraction. In a specific configuration the first index of refraction and the second index of refraction are at least 1.60 and the third index of refraction is at least 0.05 greater than the first index of refraction and the second index of refraction. In one implementation the first semi-reflective transparent layer is of a first thickness and the second semi-reflective transparent layer is of a second thickness where the first thickness and the second thickness are not greater than 2 mils. In another implementation the first thickness and the second thickness are not greater than 1 mil.

BRIEF DESCRIPTION OF THE DRAWINGS

For a better understanding of the nature and objects of various embodiments of the invention, reference should be made to the following detailed description taken in conjunction with the accompanying drawings, wherein:

FIG. 3 depicts a cross section of the micro-layered reflector structure and reflected light beam referenced in FIG. 2A.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Disclosed herein are embodiments of a micro-layered structure which is capable of being used as, for example, a foil sheeting and which is designed to allow for light lost through refraction to be redirected or "folded" back into the originally reflected light beam from the initial surface of the structure.

Figure 1B:
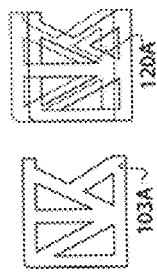
FIG. 1B illustrates the resulting image visible to a viewer's eyes post-reflection on the surface of the standard transparent reflector of FIG. 1A.
Figure 1A:
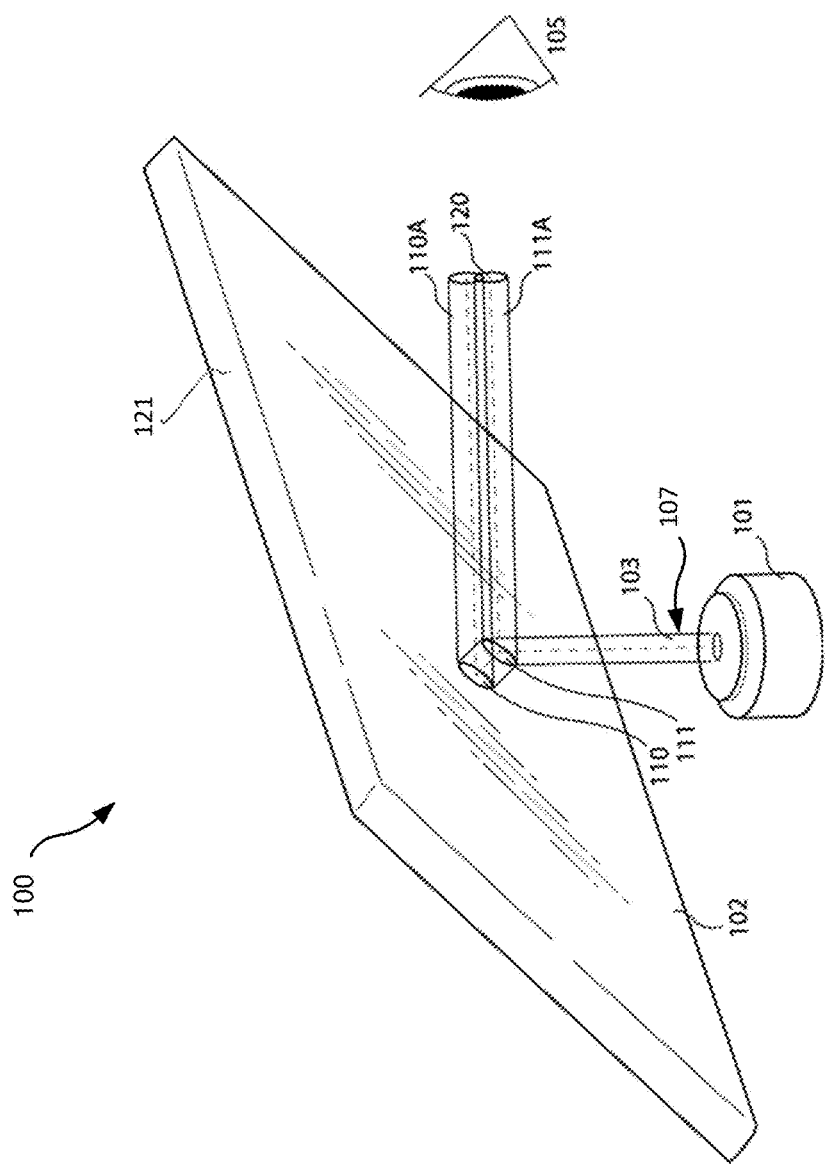
FIG. 1A illustrates a perspective view of a conventional image projection system including a standard transparent reflector material.

FIG. 1A illustrates a perspective view of a conventional image projection system 100 including a standard transparent reflector material 121 used commonly in reflective displays to reflect a visible beam of light 112 at a predetermined reflection angle. In the standard model of FIG. 1A, an image projector 101 projects the beam of light 107, which carries an image 103, onto a front surface 102 of the reflector material 121 arranged at a predefined angle relative to a viewer 105 and a direction of the beam 107. This results in a reflection of the image 103 being visible to the viewer 105 on the transparent reflector material 121. As the thickness of the reflector material 121 increases, dual, or double-reflections occur. The image 103 contacts both the front plane surface 102, creating projected image 111A, and the back plane 110, causing projected image 110A. As shown in FIG. 1B, the result of the creation of projected image 111A and projected image 110A is a composite image 120A. Thus, rather than viewing intended visible image 103A, the viewer 105 perceives the composite image 120A, which is likely to cause confusion in view of the lack of alignment of the projected images 110A, 111A.

Figure 2B:
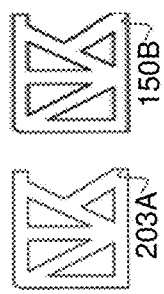
FIG. 2B illustrates the resulting image visible to a viewer's eyes post-reflection on the micro-layered reflector structure depicted in 2A.
Figure 2A:
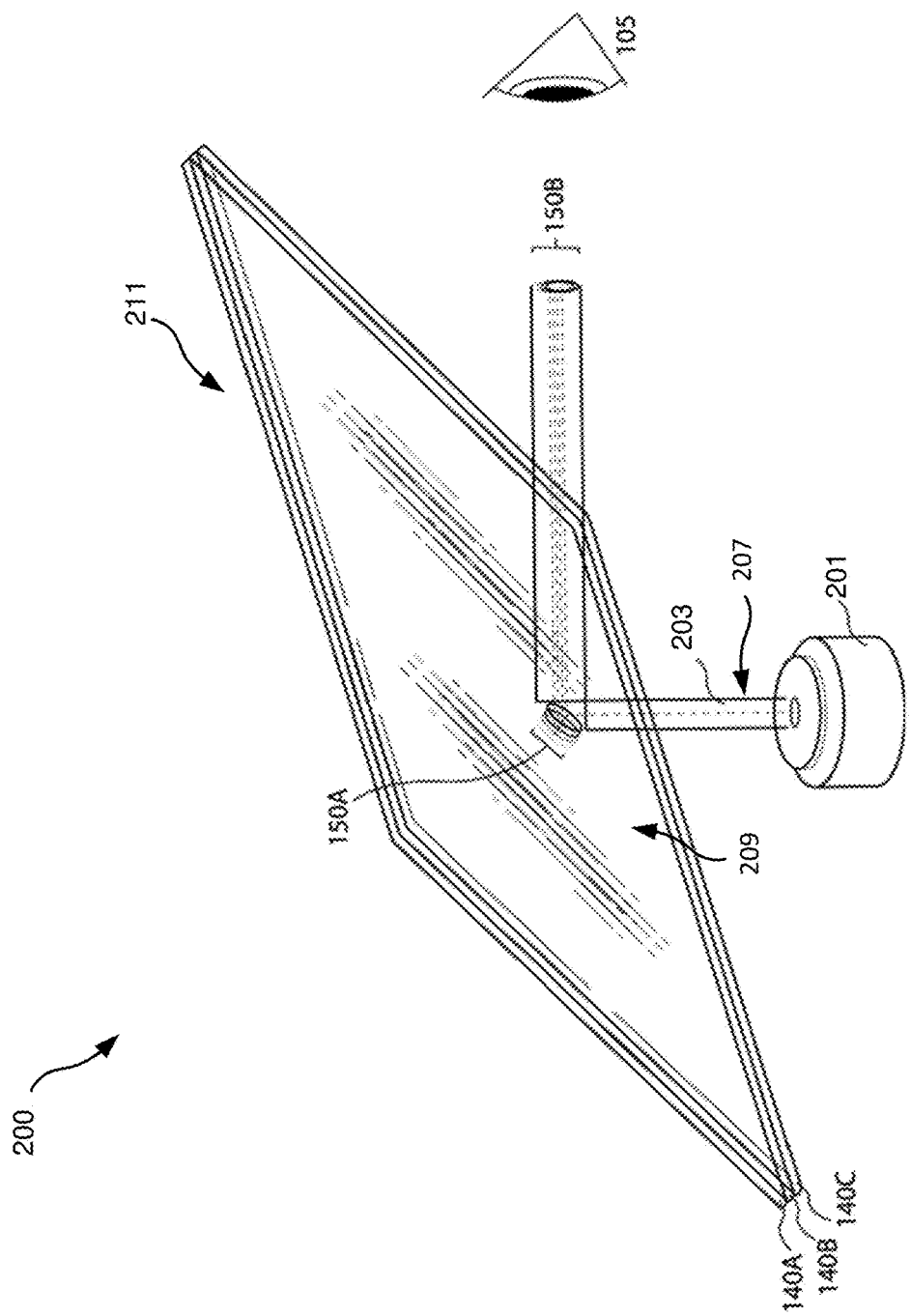
FIG. 2A provides a perspective view of an image projection system including a transparent and semi-reflective micro-layered reflector structure for a foil sheeting in accordance with an embodiment.

Attention is now directed to FIG. 2A, which provides a perspective view of an image projection 200 system including a transparent and semi-reflective micro-layered structure 211 in accordance with an embodiment. As shown, an image projector 201 projects a beam of light 207, which carries an image 203, onto a front surface 209 of the micro-layered foil sheeting 211, which may also be referred to hereinafter as the micro-layered foil sheeting 211 or simply the foil sheeting 211. As is described hereinafter, the foil sheeting 200 is designed and constructed to cause light lost through refraction at the front surface 209 to be redirected or "folded" back into the light beam originally reflected from the front surface 209 of the foil sheeting 211. In this way the foil sheeting 211 effectively operates as a layered lens which may be used to improve the vibrant strength of optical projection systems, such as prism, beam-splitter, or peppers-ghost projection systems.

In one embodiment the foil sheeting 211 includes thin layers of transparent materials 140A, 140B, 140C (not limited in number) with defined indices of refraction per layer. This combination of two or more layers of material 140 allows for most traditionally lost light energy to be redirected to the viewer 205 at the point of initial reflection 150A. This causes the final reflected image 150B to not only display the desired image 203A, but at higher brightness and clarity. The chemical composition of the layers 140 will typically be chosen to create minute differences in refractive indices. In one embodiment, the refractive index of each layer 140 is offset to create a weaker initial reflection and focus higher light energy on the internal layers, thereby creating a stronger projected image that can be sustained by the tertiary layers as shown in FIG. 2B.

Turing now to FIG. 3, a cross sectional view is shown of an embodiment of the micro-layered foil sheeting 211. As depicted in FIG. 3, the projected light image 203 propagates along direction 160 and contacts the front surface 209 of the initial foil layer 140C at an acute angle of incidence θ. The reflected light is bent and travels at a 45° angle toward the viewer 205. The lost light, or light lost in refraction, then contacts a back surface 309 of the initial foil layer 140C, causing a reflection corresponding to a secondary image to also propagate to the viewer 205. However, unlike in conventional systems such as the system 100 of FIG. 1, in which the reflector material 121 generally comprised of a relatively thick single layer of material, in the present system 200 each layer of the multi-layer structure 211 is preferably quite thin (e.g., <3 mils). This causes the paths of the reflections from the front surface 209 and the back surface 309 of the initial foil layer 140C to be sufficiently close so as not to be perceived by the viewer 205 as dual images, but rather as an essentially single brighter image 170. Moreover, by incorporating multiple thin foil layers 140, the foil sheeting 211 produces multiple closely aligned reflections that reinforce each other and thereby "stack" the projected light so as to further brighten the image 170.

The material thickness, and number of layers used per foil sheet or lens, is dependent on the refractive index of the foil base material, or varying indices, and the compounding haze, or clouding, which occurs with the combination of foil materials when stacking. For optimal visual clarity utilizing a base material with a haze of <0.15% within the foil sheeting is recommended. If the haze qualities of the material build to an unsatisfactory degree, the resulting image will become muddled or "cloudy". For the purposes of this disclosure, "haze" refers to the optical property of transparent polymer or glass materials in which impurities, surface roughness, optical irregularities, or other factors create a percentage of diffusion in light as it travels through the material.

Referring again to FIG. 3, the incident light further lost after propagating through the initial foil layer 140C travels through a thin adhesive membrane layer 141B. Any commonly used transparent or semi-transparent adhesive medium can be used, including, but not limited to: alloys, aromatic polymers, conductive adhesives, hot-melt adhesives, film and tape, rubber-based, micro encapsulated, solvent-based, resin and water based adhesives. A first portion of the light exiting the membrane layer 141B is then reflected by front and rear surfaces of the second foil layer 140B and a second portion of the light exiting the membrane layer 141B impinges on membrane layer 141A. As shown, light exiting the membrane layer 141 is reflected by front and rear surfaces of the first foil layer 140A.

The refractive index of the adhesive layers 141A, 141B should not be identical to that of the foil/prism layers 140A, 140B, 140C. For example, the refractive index of the adhesive layers 141A, 141B should at a minimum be 0.25 higher than the refractive index of its adjacent foil layer 140, though this is subject to alteration based on the thickness of the foil layers 140. One objective of embodiments of the present foil design is to bend light, in refraction, through each adhesive layer 141 (e.g., layer 141B) at an altered angle than that of the subsequent foil layer (e.g., layer 140B), and the previous foil layer (e.g., layer 140C).

The final image 170 presented to the viewer 205 is ultimately comprised of the two initial reflection points of the first foil layer 140C, two secondary reflection points from the second layer 140B, and finally two additional reflections from the third layer 140A. By using polymer or glass materials with high transparency and gloss, ultra clear overlay projections can be created using a multiplicity of layers to "stack" projected light.

Figure 4:
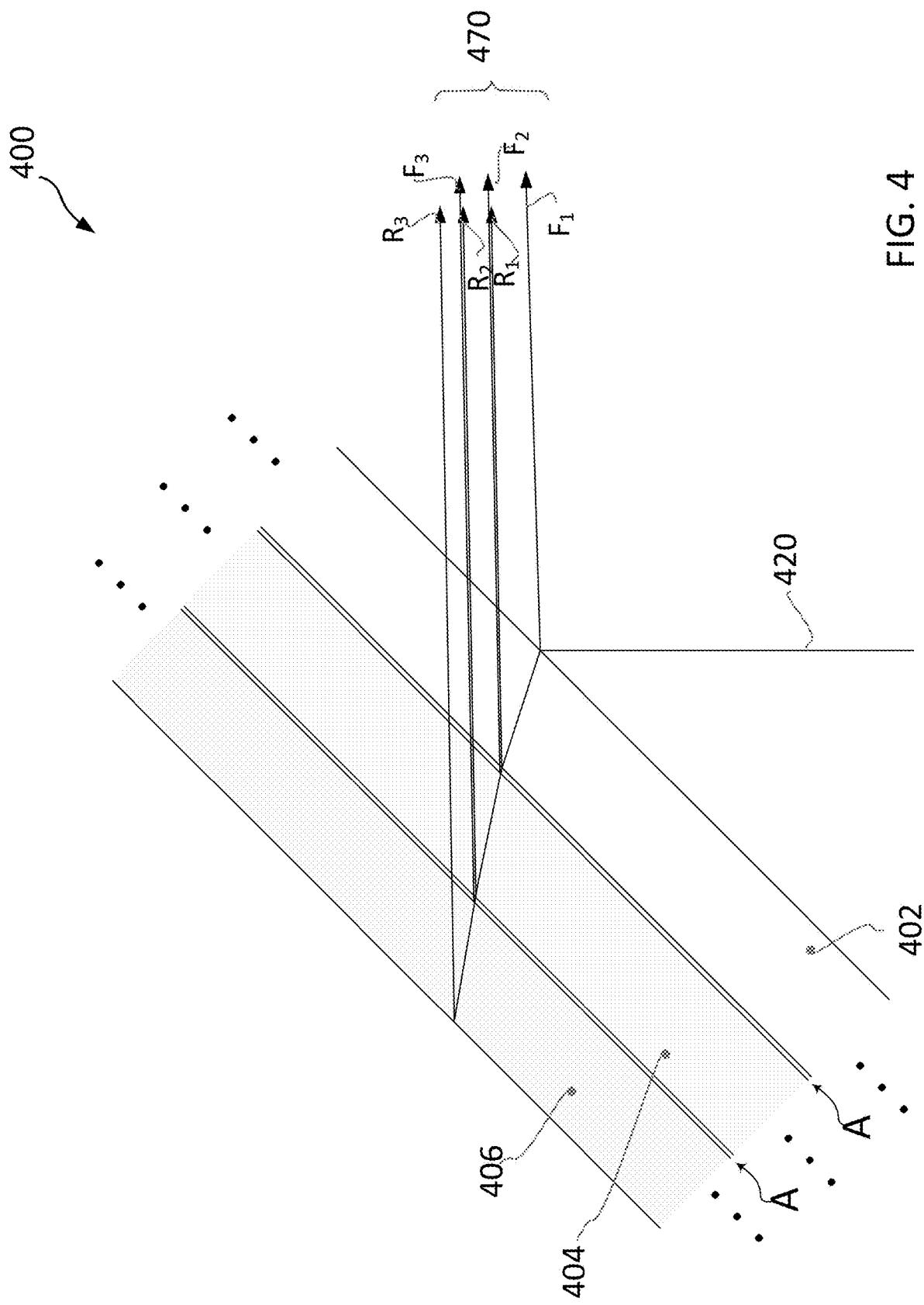
FIG. 4 provides a cross-sectional view of an alternate micro-layered reflector design for a foil sheeting in accordance with the disclosure.

Attention is now directed to FIG. 4, which provides a cross-sectional view of an alternate micro-layered reflector design in the form of a foil sheeting 400. As may be appreciated from FIG. 4, it can be seen that the foil sheeting 400 lacks adhesives between the layers of the base foil material, i.e., layers 402, 404, 406. Rather, the periphery of the layers 402, 404, 406 are air-gapped. Air-gapping in this context refers to the omission of adhesive layers between the layers 402, 404, 406 and instead sealing the edges of the layered stack via either tension, framing or heat sealing the laminate layers. In the embodiment of FIG. 4, the index of refraction of the second layer 404 is larger than the index of refraction of the initial layer 402, and the index of refraction of the third layer 406 is larger than the index of refraction of the second layer 404. Incident light 420 from an input light beam contains an image and impinges on a front surface 412 of the initial layer of material 402. The jump in refractive index between the initial layer of material 402 and the air (A) in contact with a rear surface 414 of the initial layer allows for the reflection ($R_1$) of incident light from the rear surface 414 to remain closely associated with the reflection ($F_1$) of incident light from the front surface 412.

As shown in FIG. 4, image reflections ($F_1$, $F_2$, $F_3$) reflected by the various front surfaces of the foil sheeting 400 and the image reflections ($R_1$, $R_2$, $R_3$) reflected by the various rear surfaces of the foil sheeting 400 are collectively superimposed or stacked sufficiently in alignment so as to form a single image 470 perceived by a user to be behind the foil sheeting. In the embodiment of FIG. 4 the thickness of each layer 402, 404, 406 should be <0.5 mm in order to maintain appropriate alignment between and among the images ($F_1$, $F_2$, $F_3$) reflected by the various front surfaces of the foil sheeting 400 and the images ($R_1$, $R_2$, $R_3$) reflected by the various rear surfaces of the foil sheeting 400. It has been found that optimum visible qualities appear at layer thicknesses of approximately 0.125 mm. In addition, as many layers as necessary may be added to generate the strongest possible image 470.

Figure 5A:
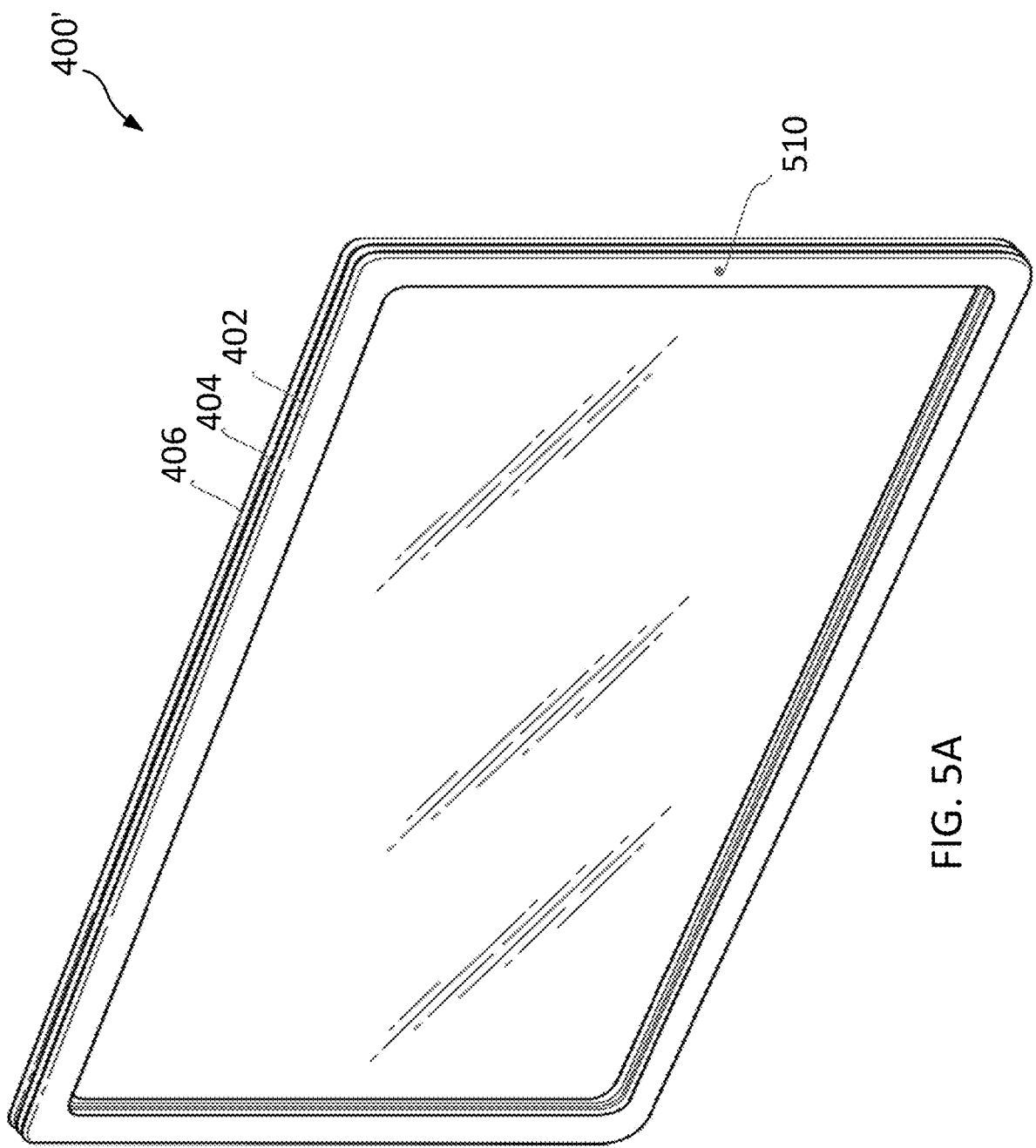
FIG. 5A is a perspective view of an air-gapped implementation of the foil sheeting of FIG. 4 which includes a framing structure surrounding the periphery of the multi-layer foil sheeting.
Figure 5B:
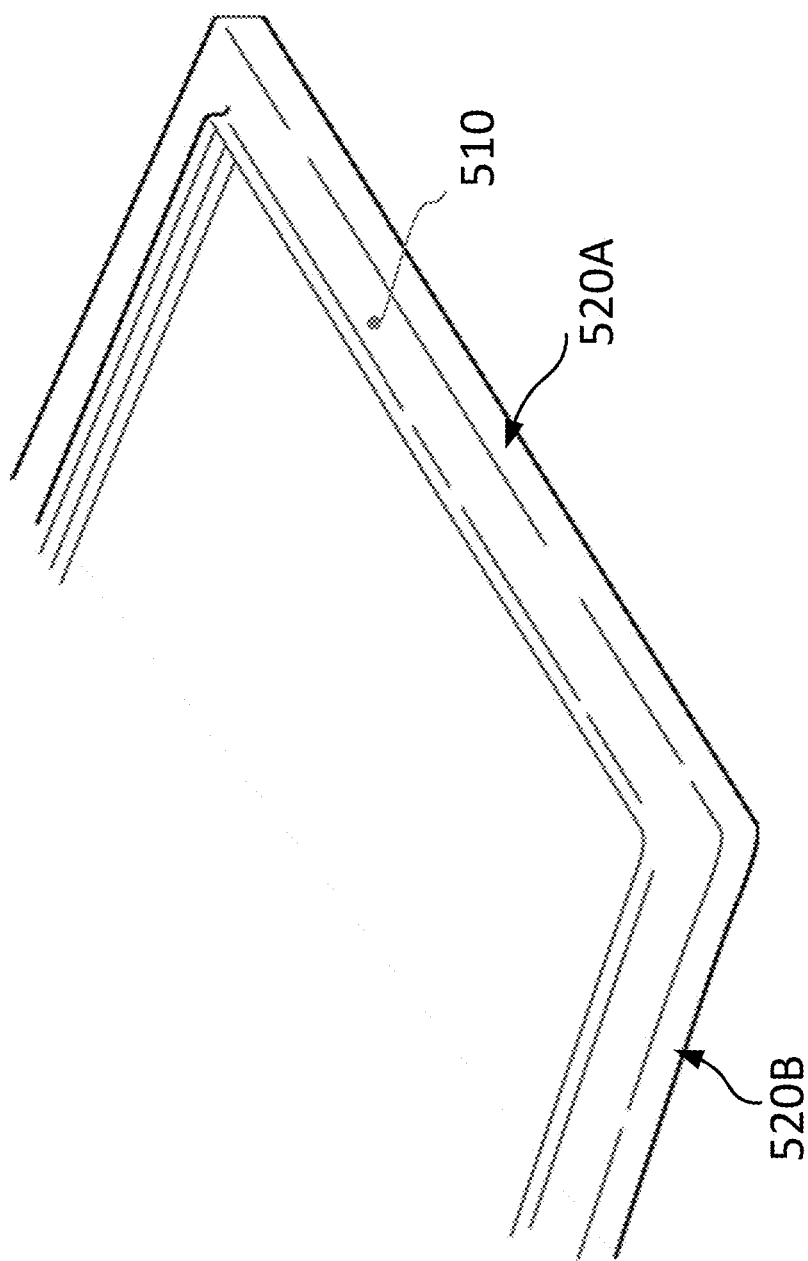
FIG. 5B is a magnified view of a portion of the air-gapped foil sheeting shown in FIG. 5A.

FIG. 5A illustrates an air-gapped implementation of the foil sheeting 400' which includes a framing structure 510 surrounding the periphery of the layers 402, 404, 406. In the embodiment of FIG. 5 the layers 402, 404, 406 may be mechanically compressed together and "snap fit" into the framing structure 510. However, other approaches to sealing the periphery of the layers 402, 404, 406 are within the scope of the air-gapped implementation of FIG. 5A. FIG. 5B is a magnified view of a portion of the air-gapped foil sheeting shown in FIG. 5A which illustrates the framing structure extending around sides 520 of the foil sheeting 400'.

The micro-layered structure disclosed herein is not limited to three layers, and, with a decrease in foil layer thickness, hundreds of layers can be used to create even denser micro-layer materials and structures. Similarly, the size of laminated multi-layer foils structured using the teachings herein can vary widely in dimension, from small handheld systems, to large, stage-dimension suspended foils.

In one embodiment the micro-layered material or structure may consist of three layers of polycarbonate, each with a thickness of 2 mils, a refractive index of 1.60, and the adjusted refractive index of the adhesive being 1.65 or higher. In another embodiment the micro-layered lens can be comprised of up to ten layers of glass or polymer, with a thickness of 1 mil or less, a refractive index of 1.50 or higher, and an adhesive refractive index of 1.55 or higher.

In another embodiment, the micro-layered lens can be comprised of more than fifteen micro-layers stacked and compressed together without the use of adhesive layers, with each micro-layer having an adjusted increase of refractive index by 0.15. By continually increasing the index of each micro-layer, light will continually bend in its refraction to create a steep arc, thus improving the final reflected image by keeping the multiplicity of reflections closer and condensed as they move behind the initial reflected image.

In another embodiment of the present semi-transparent lens arrangement the refractive indices of the constituent lens layers are not varied. Standard materials having suitable transmissive and reflective qualities for use in this embodiment include materials such as, for example: Glass, Lexan, Polycarbonate, PMMA, PET, PETG, PVC, PE, Ionomer Resins, PP, SMA, FEP, and all other transparent polymers. In one implementation the constituent layers are stacked with a given density of layers (>2) and are air-gapped or compressed. While this does not produce an optically stacked image with the same minute improvements as may be achieved through the manipulation of refractive indices, the thin materials of this lens arrangement will produce a significantly brighter image relative to systems using single layer reflectors to create optical projections.

An additional method of improving the optical clarity of projections in systems using the disclosed reflective foil sheeting or lens structure involves the addition of hard-coating deposits on the individual layers of each lens structure or foil sheeting. In one implement the surface of the initial reflection point is modified by hard-coating addition (sol-gel, thermal spray, vapor deposition). This allows the refractive index of layers made from standard materials (e.g., Glass, Lexan, Polycarbonate, PMMA, PET, PETG, PVC, PE, Ionomer Resins, PP, SMA, FEP, and all other transparent polymers) to significantly vary from the initial point of light incidence and reflection on the front of the layer to the point of secondary reflection on the back of the layer.

As previously stated, the efficacy of the optical stacking described herein may be attributed to balancing the separation of the reflected images from one another (so that the material layers do not generate secondary detached reflections) while keeping each reflected image aligned close enough in succession with the previous and next reflected image that the viewer does not readily perceive the detachment of each included reflection.

From the above discussion it may be appreciated that the varying the refractive indices of each lens layer is intended to cause the refracted light to be directed back in a way that will establish the secondary point of incidence on the subsequent layers at a location resulting in better stacking of the resulting projections; that is, at location as close to directly behind the initial reflection point as possible, from the perception of the user.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above. Accordingly, the specification is intended to embrace all such modifications and variations of the disclosed embodiments that fall within the spirit and scope of the appended claims.

In addition, various inventive concepts may be embodied as one or more methods, of which an example has been provided. The acts performed as part of the method may be ordered in any suitable way. Accordingly, embodiments may be constructed in which acts are performed in an order different from illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A micro-layered structure for use in an optical projection system, the micro-layered structure comprising:
   a first semi-reflective transparent layer having a first index of refraction, the first semi-reflect transparent layer having a first front surface and a first rear surface;
   a second semi-reflective transparent layer having a second index of refraction different from the first index of refraction, the second semi-reflect transparent layer having a second front surface and a second rear surface, the second front surface abutting the first rear surface of the first semi-reflective transparent layer;
   wherein the micro-layered structure is configured to reflect incident light as multiple reflections;
   wherein a first portion of the incident light is reflected by the first front surface as a first reflection, a second portion of the incident light is reflected by the first rear surface as a second reflection, a third portion of the incident light is reflected by the second front surface as a third reflection and a fourth portion of the incident light is reflected by the second rear surface as a fourth reflection;
   wherein the first reflection, the second reflection, the third reflection and the fourth reflection collectively form a projection of the image wherein the projection of the image is perceived by a user of the optical projection system to be located behind the micro-layered structure.

2. The micro-layered structure of claim 1 wherein the second index of refraction is at least 0.15 greater than the first index of refraction.

3. The micro-layered structure of claim 1 further including a third semi-reflective transparent layer having a third index of refraction different from the first index of refraction and the second index of refraction, the third semi-reflect transparent layer having a third front surface and a third rear surface, the third front surface abutting the second rear surface of the second semi-reflective transparent layer;
   wherein a fifth portion of the incident light is reflected by the third front surface as a fifth reflection and a sixth portion of the incident light is reflected by third rear surface as a sixth reflection;
   wherein the first reflection, the second reflection, the third reflection, the fourth reflection, the fifth reflection and the sixth reflection collectively form the projection of the image.

4. The micro-layered structure of claim 3 wherein the second index of refraction is at least 0.15 greater than the first index of refraction and the third index of refraction is at least 0.15 greater than the second index of refraction.

5. The micro-layered structure of claim 1 wherein the first semi-reflective transparent layer is of a first thickness and the second semi-reflective transparent layer is of a second thickness and wherein the first thickness and the second thickness are not greater than 0.5 mm.

6. The micro-layered structure of claim 1 wherein the first semi-reflective transparent layer is of a first thickness and the second semi-reflective transparent layer is of a second thickness and wherein the first thickness and the second thickness are not greater than 0.125 mm.

7. The micro-layered structure of claim 5 or claim 6 wherein the second index of refraction is at least 0.15 greater than the first index of refraction.

8. The micro-layered structure of claim 1 further including a frame structure arranged around a periphery of the first semi-reflective transparent layer and the second semi-reflective transparent layer, the frame structure forming a seal around the first semi-reflective transparent layer and the second semi-reflective transparent layer.

9. A micro-layered structure for use in an optical projection system, the micro-layered structure comprising:
a first semi-reflective transparent layer having a first index of refraction, the first semi-reflect transparent layer having a first front surface and a first rear surface;
a second semi-reflective transparent layer having a second index of refraction different from the first index of refraction, the second semi-reflect transparent layer having a second front surface and a second rear surface;
a first adhesive layer interposed between the second front surface of the second semi-reflective transparent layer and the first rear surface of the first semi-reflective transparent layer, the first adhesive layer joining the first semi-reflective transparent layer to the second semi-reflective transparent layer and having a third index of refraction different from the first index of refraction and the second index of refraction;
wherein the micro-layered structure is configured to reflect incident light defining an image as multiple reflections;
wherein a first portion of the incident light is reflected by the first front surface as a first reflection, a second portion of the incident light is reflected by the first rear surface as a second reflection, a third portion of the incident light is reflected by the second front surface and a fourth portion of the incident light is reflected by the second rear surface;
wherein the first reflection, the second reflection, the third reflection and the fourth reflection collectively form a projection of the image perceptible to a user of the projection system.

10. The micro-layered structure of claim 9 wherein the first index of refraction is equal to the second index of refraction.

11. The micro-layered structure of claim 9 wherein the first index of refraction is different from the second index of refraction.

12. The micro-layered structure of claim 9 wherein the first semi-reflective transparent layer is of a first thickness and the second semi-reflective transparent layer is of a second thickness and wherein the first thickness and the second thickness are not greater than 2 mils.

13. The micro-layered structure of claim 12 wherein the first index of refraction and the second index of refraction are at least 1.60 and wherein the third index of refraction is at least 0.05 greater than the first index of refraction and the second index of refraction.

14. The micro-layered structure of claim 9 wherein the first semi-reflective transparent layer is of a first thickness and the second semi-reflective transparent layer is of a second thickness and wherein the first thickness and the second thickness are not greater than 1 mil.

15. The micro-layered structure of claim 14 wherein the first index of refraction and the second index of refraction are at least 1.50 and wherein the third index of refraction is at least 0.05 greater than the first index of refraction and the second index of refraction.

16. An optical projection system, comprising:
a projector configured to transmit light defining an image;
a semi-transparent micro-layered structure having a front surface arranged at an angle to a plane of emission of the light transmitted by the projector and configured to produce a projection of the image wherein the projection appears to be located behind a rear surface of the semi-transparent micro-layered structure, the semi-transparent micro-layered structure including;
a first semi-reflective transparent layer having a first index of refraction,
a second semi-reflective transparent layer having a second index of refraction,
a first adhesive layer interposed between the first semi-reflective transparent layer and the second semi-reflective transparent layer, the first adhesive layer having a third index of refraction different from the first index of refraction and the second index of refraction.

17. The optical projection system of claim 16 wherein the first index of refraction and the second index of refraction are substantially equal.

18. The optical projection system of claim 16 wherein the first semi-reflect transparent layer has a first front surface and a first rear surface and the second semi-reflect transparent layer has a second front surface and a second rear surface;
wherein the micro-layered structure is configured to reflect the light transmitted by the projector as multiple reflections;
wherein a first portion of the light is reflected by the first front surface as a first reflection, a second portion of the light is reflected by the first rear surface as a second reflection, a third portion of the light is reflected by the second front surface and a fourth portion of the light is reflected by the second rear surface;
wherein the first reflection, the second reflection, the third reflection and the fourth reflection collectively form an optical projection of the image perceptible to a user of the optical projection system.

19. The optical projection system of claim 16 wherein the first index of refraction is equal to the second index of refraction.

20. The optical projection system of claim 16 wherein the first index of refraction is different from the second index of refraction.

21. The optical projection system of claim 16 wherein the first semi-reflective transparent layer is of a first thickness and the second semi-reflective transparent layer is of a second thickness and wherein the first thickness and the second thickness are not greater than 2 mils.

22. The optical projection system of claim 21 wherein the first index of refraction and the second index of refraction are at least 1.60 and wherein the third index of refraction is at least 0.05 greater than the first index of refraction and the second index of refraction.

23. The optical projection system of claim 16 wherein the first semi-reflective transparent layer is of a first thickness and the second semi-reflective transparent layer is of a second thickness and wherein the first thickness and the second thickness are not greater than 1 mil.

24. An optical projection system, comprising:
a projector configured to transmit light defining an image;
a semi-transparent micro-layered structure having a front surface arranged at an angle to a plane of emission of the light transmitted by the projector and configured to produce a projection of the image wherein the projection of the image appears to be located behind a rear surface of the semi-transparent micro-layered structure, the semi-transparent micro-layered structure including;
a first semi-reflective transparent layer having a first index of refraction,
a second semi-reflective transparent layer having a second index of refraction;
wherein the first semi-reflective transparent layer is of a first thickness and the second semi-reflective transparent layer is of a second thickness and wherein the first thickness and the second thickness are not greater than 2 mils; and
wherein the first index of refraction and the second index of refraction are at least 1.60 and wherein a third index of refraction is at least 0.05 greater than the first index of refraction and the second index of refraction.

25. The optical projection system of claim 24 wherein the first semi-reflect transparent layer has a first front surface and a first rear surface and the second semi-reflect transparent layer has a second front surface and a second rear surface;
wherein the micro-layered structure is configured to reflect the light transmitted by the projector as multiple reflections;
wherein a first portion of the light is reflected by the first front surface as a first reflection, a second portion of the light is reflected by the first rear surface as a second reflection, a third portion of the light is reflected by the second front surface and a fourth portion of the light is reflected by the second rear surface;
wherein the first reflection, the second reflection, the third reflection and the fourth reflection collectively form a projection of the image perceptible to a user of the optical projection system.

26. The optical projection system of claim 24 wherein the first index of refraction is equal to the second index of refraction.

27. The optical projection system of claim 24 wherein the first index of refraction is different from the second index of refraction.

28. The optical projection system of claim 24 wherein the first semi-reflective transparent layer is of a first thickness and the second semi-reflective transparent layer is of a second thickness and wherein the first thickness and the second thickness are not greater than 1 mil.

\* \* \* \* \*